US012090865B2

(12) United States Patent
Bauer et al.

(10) Patent No.: US 12,090,865 B2
(45) Date of Patent: Sep. 17, 2024

(54) STORAGE MODULE FOR AN ENERGY STORE OF A MOTOR VEHICLE, AND ENERGY STORE

(71) Applicant: Bayerische Motoren Werke Aktiengesellschaft, Munich (DE)

(72) Inventors: Christoph Bauer, Herrsching (DE); Thomas Hammerschmidt, Unterschleissheim (DE); Simon Nuernberger, Bad Aibling (DE); Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 934 days.

(21) Appl. No.: 17/053,316

(22) PCT Filed: Jun. 28, 2019

(86) PCT No.: PCT/EP2019/067301
§ 371 (c)(1),
(2) Date: Nov. 5, 2020

(87) PCT Pub. No.: WO2020/002580
PCT Pub. Date: Jan. 2, 2020

(65) Prior Publication Data
US 2021/0075072 A1 Mar. 11, 2021

(30) Foreign Application Priority Data
Jun. 28, 2018 (DE) .................... 10 2018 210 662.2

(51) Int. Cl.
*H01M 10/615* (2014.01)
*B60L 50/64* (2019.01)
(Continued)

(52) U.S. Cl.
CPC .............. *B60L 50/64* (2019.02); *H01G 11/26* (2013.01); *H01M 10/615* (2015.04);
(Continued)

(58) Field of Classification Search
CPC ............. H01M 10/615; H01M 10/658; H01M 50/209; H01M 50/51; H01M 50/264;
(Continued)

(56) References Cited

U.S. PATENT DOCUMENTS

| 5,508,126 A | 4/1996 | Braun |
| 2003/0099880 A1 | 5/2003 | Park et al. |

(Continued)

FOREIGN PATENT DOCUMENTS

| CN | 1423358 A | 6/2003 |
| CN | 104756308 A | 7/2015 |

(Continued)

OTHER PUBLICATIONS

International Search Report (PCT/ISA/210) issued in PCT Application No. PCT/EP2019/067301 dated Oct. 16, 2019 with English translation (five (5) pages).

(Continued)

*Primary Examiner* — James Lee
(74) *Attorney, Agent, or Firm* — Crowell & Moring LLP

(57) ABSTRACT

The storage module for an energy store of a motor vehicle includes multiple storage cells. The multiple storage cells are wired together according to a circuit topology and are electrically connected together for storing electric energy. Each storage cell has at least one electric heating element for heating the each storage cell. The heating elements are electrically connected to one another according to the same circuit topology.

11 Claims, 5 Drawing Sheets

(51) Int. Cl.
  *H01G 11/26* (2013.01)
  *H01M 50/209* (2021.01)
  *H01M 50/51* (2021.01)
  *H02J 7/00* (2006.01)
  *H01M 10/658* (2014.01)
  *H01M 50/264* (2021.01)

(52) U.S. Cl.
  CPC ......... *H01M 50/209* (2021.01); *H01M 50/51* (2021.01); *H02J 7/00* (2013.01); *H02J 7/00309* (2020.01); *H01M 10/658* (2015.04); *H01M 50/264* (2021.01)

(58) Field of Classification Search
  CPC ......... B60L 50/64; H02J 7/00; H02J 7/00309; H01G 11/26
  See application file for complete search history.

(56) References Cited

U.S. PATENT DOCUMENTS

| | | |
|---|---|---|
| 2012/0133329 A1 | 5/2012 | Yoshida et al. |
| 2014/0113166 A1 | 4/2014 | Schneider et al. |
| 2015/0229011 A1 | 8/2015 | Gless |
| 2015/0244192 A1 | 8/2015 | Dauchy et al. |
| 2016/0028128 A1 | 1/2016 | Limvorapun |
| 2017/0256832 A1 | 9/2017 | Li et al. |
| 2019/0074559 A1 | 3/2019 | Demund et al. |
| 2019/0075850 A1* | 3/2019 | Xiao ............... H05B 1/0297 |

FOREIGN PATENT DOCUMENTS

| | | |
|---|---|---|
| DE | 10 2012 219 082 A1 | 4/2014 |
| DE | 10 2013 013 170 A1 | 7/2014 |
| DE | 10 2016 208 063 A1 | 11/2017 |
| EP | 2 978 044 A1 | 1/2016 |
| EP | 2 904 687 B1 | 9/2016 |
| WO | WO 93/13568 A1 | 7/1993 |
| WO | WO 2012/153230 A1 | 11/2012 |

OTHER PUBLICATIONS

German-language Written Opinion (PCT/ISA/237) issued in PCT Application No. PCT/EP2019/067301 dated Oct. 16, 2019 (seven (7) pages).

German-language Search Report issued in German Application No. 10 2018 210 662.2 dated Mar. 14, 2019 with partial English translation (13 pages).

Chinese-language Office Action issued in Chinese Application No. 201980020959.2 dated Apr. 28, 2023 with English translation (16 pages).

* cited by examiner

STORAGE MODULE FOR AN ENERGY STORE OF A MOTOR VEHICLE, AND ENERGY STORE

BACKGROUND AND SUMMARY OF THE INVENTION

The present subject matter relates to a storage module for an energy store of a motor vehicle. Furthermore, the present subject matter relates to an energy store for a motor vehicle.

EP 2 904 687 B1 discloses a circuit for managing recharging of a battery having a plurality of elementary cells connected in series. In this case, the circuit has a multiplicity of heating elements, wherein each heating element is a Zener diode or an element according to a Zener diode.

WO 93/13568 A1 discloses an arrangement for improving the current output of a chargeable battery at low outside temperatures for a consumer. A temperature sensor arranged in a liquid-tight and acid-proof manner in the interior of the battery releases a current flow through at least one heating element if the battery temperature is below a predefined setpoint temperature value. Moreover, DE 10 2016 208 063 A1 discloses a heatable battery.

It is an object of the present subject matter to further develop a storage module and an energy store such that the costs of the storage module and of the energy store, respectively, can be kept low.

A first aspect of the present subject matter relates to a storage module for an energy store of a motor vehicle, in particular of an automobile preferably embodied as a car. The storage module has a plurality of storage cells for storing electrical energy or electrical current, said storage cells being interconnected with one another and thereby electrically connected to one another in accordance with a circuit topology. The respective storage cell is preferably an electrochemical storage cell, by means of which electrical energy can be stored electrochemically. The energy store is thus preferably embodied as an electrochemical energy store, by means of or in which electrical energy can be stored electrochemically. In its fully manufactured state, the energy store preferably comprises a plurality of storage modules according to the present subject matter. In this case, the storage modules are electrically connected to one another, such that the energy store can have or provide a high electrical voltage, in particular electrical operating voltage. The energy store is preferably embodied as a high-voltage store, such that the electrical voltage, in particular the electrical operating voltage, is preferably greater than 50 volts and is preferably hundreds of volts. As a result, it is possible to realize, for example, high electrical powers for electrically driving the motor vehicle. In its fully manufactured state, the motor vehicle has, for example, the energy store and thus the storage module and also at least one electric machine, by means of which the motor vehicle embodied, for example, as a hybrid or electric vehicle can be driven electrically. The motor vehicle can be embodied as a battery electric vehicle. In order to electrically drive the motor vehicle by means of the electric machine, the electric machine is operated in motor operation and thus, as an electric motor. In order to operate the electric machine in motor operation, the electric machine is supplied with electrical energy stored in the energy store and thus, in the storage module or in the storage cells of the storage module.

The respective storage cell can be embodied as a battery cell, in particular as a lithium-ion cell, such that the energy store is preferably embodied as a battery, in particular as a lithium-ion battery. In particular, the energy store can be embodied as a high-voltage battery (HV battery).

The respective storage cell of the storage module is assigned at least one electrical heating element for heating the respective storage cell. In other words, the respective electrical heating element can be operated electrically, such that by means of the respective heating element, using electrical energy fed to the respective heating element, the respective storage cell to which the respective heating element is assigned can be warmed up and thus heated. As a result, a sufficiently high temperature of the storage cell can be ensured even at low ambient or outside temperatures, such that advantageously the storage module can provide electrical energy or that advantageously electrical energy can be stored in the storage module and the energy store can thus be charged with electrical energy.

In order, then, that the number of parts and thus the costs, the weight and the structural space requirement of the storage module and thus of the energy store overall can be kept within low limits, the present subject matter provides for the heating elements to be interconnected with one another and thereby electrically connected to one another in accordance with the same circuit topology in accordance with which the storage cells are interconnected with one another and thereby electrically connected to one another. Thus, if the storage cells are connected in series with one another, for example, such that the circuit topology is a series circuit, then the heating elements assigned to the storage cells are also connected in series with one another among one another.

If the storage cells are arranged in parallel with one another or interconnected in parallel with one another, for example, such that the circuit topology is a parallel circuit of the storage cells, which are also referred to simply as cells, then the heating elements are also connected in parallel with one another or interconnected in parallel with one another. By virtue of the use of the same circuit topology in accordance with which both the storage cells and the electrical heating elements are interconnected with one another, the storage cells can be embodied as identical parts, and the heating elements can also be embodied as identical parts. This should be understood to mean, in particular, that the storage cells have the same construction, and the electrical heating elements also have the same construction. By means of the storage cells being correspondingly interconnected with one another or electrically connected to one another, different structural variants of the storage module can be created in a simple manner. In a first of the structural variants, the circuit topology is a series circuit, for example, wherein, in a second of the structural variants, the circuit topology is a parallel circuit, for example. In a likewise simple manner, the heating elements can be interconnected with one another and thereby electrically connected to one another, such that the heating elements, with regard to their interconnection with one another, can be adapted to the respective interconnection of the storage cells among one another in a simple manner. In this way it is possible to avoid having to realize a dedicated structural variant of a heating device for heating the storage module for each structural variant of the storage module, with the result that the different structural variants can be produced in a simple and cost-effective manner. Moreover, the storage module can be repaired in a simple and thus cost-effective manner since, for example, defective heating elements can be exchanged or replaced in a simple manner.

The respective heating element is embodied as a planar heating element, for example, such that large-area heating of the respective storage cell can be ensured. Furthermore, it is conceivable for the respective heating element to be embodied as a heating film. Alternatively or additionally, the heating element has an at least substantially meandering course, for example, at least in a partial region, such that the respective storage cell can be heated advantageously.

In one advantageous embodiment of the present subject matter, the storage module has at most or exactly two switching elements, by means of which some or all heating elements of the storage module are electrically connectable to some or all storage cells of the storage module and thereby activatable. Moreover, by means of the switching elements, some or all heating elements of the storage module are disconnectable from some or all storage cells of the storage module and thereby reactivatable. By virtue of the use of the at most or exactly two switching elements, firstly the number of parts can be kept low. Secondly, reliable operation can be realized as a result, since the heating element can, for example, be activated and deactivated even if one of the switching elements has failed and the other switching element is still operational.

In order that the number of parts and thus the costs and the structural space requirement can be kept within low limits, a further configuration of the present subject matter provides for the storage module to have at most or exactly one switching element, by means of which some or all heating elements of the storage module are electrically connectable to some or all storage cells of the storage module and thereby activatable and disconnectable from some or all storage cells and thereby deactivatable.

The respective switching element can be adjusted or switched over between at least one open state and at least one closed state, for example. In the closed state, the heating elements are electrically connected to the storage cells of the storage module, as a result of which the electrical heating elements are activated. This should be understood to mean, in particular, that the heating elements are supplied with electrical energies stored in the storage cells of the storage module, as a result of which the storage cells are heated by means of the heating elements with use of the electrical energy. In the open state, the heating elements are electrically disconnected from the storage cells, such that the heating elements are deactivated and such that heating of the storage cells brought about by the heating elements stops.

Since provision is made of at most two switching elements, preferably at most one switching element, per storage module, a space-saving integration of the switching element can be realized. Moreover, the number of parts and thus the costs and the structural space requirement can be kept within low limits.

In one advantageous embodiment of the present subject matter, the switching element has at most or exactly two switches. As a result, reliable operation can be realized, as a result of which at the same time the number of parts and thus the costs can be kept low.

In order to realize advantageous operation in a cost-effective and weight-expedient manner, a further configuration of the present subject matter provides for the switches to be connected in series with one another or interconnected in series with one another.

In order that the number of parts and thus the costs can be kept within low limits, a further configuration of the present subject matter provides for the switching element to have at most one switch.

The switch is preferably embodied as a metal oxide semiconductor field effect transistor (MOSFET), such that advantageous operation is producible in a weight-expedient and cost-effective manner.

In order to realize advantageous and reliable operation in a simple, cost-effective and weight-expedient manner, a further embodiment of the present subject matter provides for the switching element to be assigned exactly one optocoupler, by means of which switchover of the assigned switch to which the optocoupler is assigned is able to be effected. Switchover between the open state and the closed state can thus be realized by means of the optocoupler. At the same time, the optocoupler enables a particularly advantageous galvanic isolation. As a result, it is possible, for example, to avoid a situation in which the high electrical voltage provided or providable by the storage module is impressed on a system in which the voltage is significantly lower than the electrical voltage of the storage module, and which is 12 volts, for example, is impressed. Undesired damage to the system can thus be avoided in a simple, cost-effective and weight-expedient manner.

A further configuration of the present subject matter provides for the respective electrical heating element to have at least or preferably exactly two terminals, wherein the heating elements are interconnected with one another and thereby electrically connected to one another via the terminals.

In this case, it has been found to be advantageous if one of the terminals of the respective heating element is electrically connected to a respective cell housing of the storage cell assigned to the respective heating elements. As a result, the structural space requirement can be kept low. In this case, the heating elements are electrically interconnected with one another with mediation of the cell housings of the storage cells.

In order to be able to ensure advantageous operation here in an expedient manner in respect of structural space, a further configuration of the present subject matter provides for an electrolyte to be accommodated in the cell housing and to be electrically insulated from the cell housing. As a result, undesired, excessive and internal corrosion of the respective storage cell, in particular of the respective cell housing, can be avoided in a simple, cost-effective and weight-expedient manner.

In order to be able to ensure advantageous operation of the energy store and/or of the storage module in an expedient manner in respect of structural space, a further configuration of the present subject matter provides for the storage cells to be arranged successively along a stacking direction. As a result, the storage cells form a cell stack of the storage module, for example, wherein the storage module preferably has exactly one cell stack in the form of the cell stack mentioned above. Here in each case at least one electrical heating element is arranged on two sides of the respective storage cell that face away from one another along the stacking direction. As a result, the respective storage cell can be heated advantageously.

The electrical heating element is arranged, for example, in the cell housing or else outside the cell housing, as a result of which advantageous heating of the respective storage cell can be realized.

A second aspect of the present subject matter relates to a storage module for an energy store of a motor vehicle. The storage module in accordance with the second aspect of the present subject matter comprises a plurality of cell groups, also referred to as cell clusters. The cell groups each have a plurality of storage cells for storing electrical energy, said storage cells being in particular exclusively interconnected in parallel with one another and thereby electrically connected to one another. The respective storage cell of the respective cell group is assigned at least one electrical heating element for heating the respective storage cell. In this case, exactly one switching element is provided per cell group, by means of which switching element some or all heating elements of the respective cell group are electrically connectable to some or all storage cells of the storage module and thereby activatable and disconnectable from some or all storage cells of the storage module and thereby deactivatable. Advantages and advantageous configurations of the first aspect of the present subject matter should be regarded as advantages and advantageous configurations of the second aspect of the present subject matter, and vice versa. The cell clusters are connected in series with one another or connected in series with respect to one another, for example. Furthermore, provision is preferably made for the heating elements of the respective cell cluster to be connected in parallel with one another or interconnected in parallel with one another, such that the heating elements of the respective cell cluster that are interconnected in parallel with one another and thereby electrically connected to one another form a heating element cluster. The heating element clusters are interconnected in series with one another or connected in series with one another, for example. As a result, the number of parts and thus the costs and the structural space requirement of the storage module can be kept within low limits.

A third aspect of the present subject matter relates to an energy store for a motor vehicle, wherein the energy store according to the present subject matter has at least one or a plurality of storage modules according to the present subject matter. Advantages and advantageous configurations of the first aspect and of the second aspect of the present subject matter should be regarded as advantages and advantageous configurations of the third aspect of the present subject matter, and vice versa.

Further details of the present subject matter are evident from the following description of example drawings.

BRIEF DESCRIPTION OF THE DRAWINGS

In the figures, identical or functionally identical elements are provided with identical reference signs.

DETAILED DESCRIPTION OF THE DRAWINGS

Figure 1:
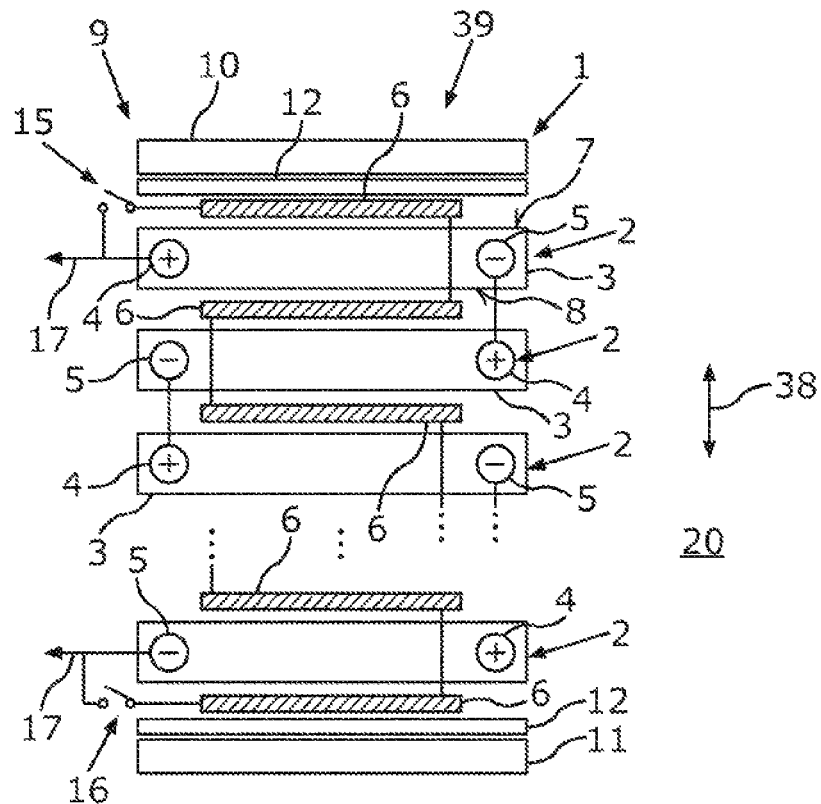
FIG. 1 shows as an excerpt a schematic plan view of a storage module according to the present subject matter.

FIG. 1 shows as an excerpt in a schematic plan view a storage module 1 in accordance with an energy store of a motor vehicle, in particular of an automobile embodied, for example, as a car. In its fully manufactured state, the motor vehicle has the energy store, which can have a plurality of storage modules 1, for example. In this case, the storage modules 1 are electrically connected to one another. Furthermore, the motor vehicle comprises at least one electric machine by means of which the motor vehicle can be driven. In order to drive the motor vehicle by means of the electric machine, the electric machine is operated in motor operation and thus as an electric motor. For this purpose, the electric machine is supplied with electrical energy stored in the energy store. In order to be able to realize high electrical power for electrically driving the motor vehicle, the energy store is embodied as a high-voltage component, that is to say as a high-voltage store, the electrical voltage, in particular electrical operating voltage, of which is greater than 50 volts and is preferably hundreds of volts. The storage module 1 has, for example, an electrical voltage, in particular an electrical operating voltage, which in turn is greater than 50 volts and is for example, at least 60 volts.

The storage module 1 has a plurality of storage cells 2 embodied as battery cells, for example, said storage cells being arranged successively or one behind another along a stacking direction, illustrated by a double-headed arrow 38 in FIG. 1. As a result, the storage cells 2 form a cell stack 39, for example, wherein the storage module 1 has exactly or exclusively one cell stack in the form of the cell stack 4.

The respective storage cell 2 has a cell housing 3 and terminals 4 and 5. The terminals 4 and 5 are electrically insulated from the cell housing 3, for example. The terminal 4 forms, for example, a first electrical pole of the respective storage cell 2, wherein the first electrical pole is an electrical positive pole in the present case. The terminal 5 forms, for example, a respective second electrical pole of the respective storage cell 2, wherein the second electrical pole is a negative pole, for example. In this case, the storage cells 2 are interconnected with one another and thereby electrically connected to one another in accordance with a predefinable or predefined circuit topology via their terminals 4 and 5. In the example shown in FIG. 1, the circuit topology is embodied as a series circuit, such that the storage cells 2 are connected in series with one another or interconnected in series with one another via their terminals 4 and 5. Electrical energy can be stored by means or in the respective storage cell 2. The respective storage cell 2 has, for example, an electrical voltage, in particular an electrical operating voltage, which is at most 4 volts, for example. In particular, the respective storage cell 2 can have storage means for storing the electrical energy, said storage means being accommodated in the respective cell housing 3. The storage means comprise, for example, at least or exactly two electrodes of different polarities and also an electrolyte, in which the electrodes are accommodated or immersed at least partly, in particular at least predominantly or completely. In this case, the storage means are accommodated in the cell housing 3. A first of the electrodes is a cathode, for example, which is, for example, electrically connected to the terminal 4 and electrically insulated from the terminal 5. The second electrode is an anode, for example, which is electrically connected to the terminal 5 and electrically insulated from the terminal 4. By way of example, an electrical insulator is arranged between the electrodes, the electrodes being electrically insulated from one another by means of said electrical insulator. The electrodes form an electrode stack, for example, or else the electrodes form an electrode winding, also referred to as jelly roll. In this case, by way of example, the insulator arranged between the electrodes is wound up with the electrodes to form the electrode winding.

Furthermore, the respective storage cell 2 is assigned at least one electrical heating element 6, by means of which the respectively assigned storage cell 2 can be heated and thus warmed up with the use of electrical energy. It is evident from FIG. 1 that the respective storage cell 2 has two sides 7 and 8 facing away from one another along the stacking direction. In this case, at least or exactly one electrical heating element 6 is arranged on the respective side 7 and 8, such that, for example, the respective storage cell 2 is arranged between at least or exactly two electrical heating elements 6 along the stacking direction.

In FIG. 1, the heating elements 6 are arranged outside the cell housings 3, wherein it is also alternatively conceivable that the respective heating element 6 can be arranged in the respective cell housing 3 of the respectively assigned storage cell 2.

Furthermore, the storage module 1 has a clamping device 9, for example, by means of which the storage cells 2 are braced against one another and thus held against one another at least indirectly along the stacking direction. For this purpose, the clamping device 9 comprises respective plates 10 and 11, also referred to as pressure plates, end plates, pressure end plates or module pressure end plates, wherein the storage cells 2 or the cell stack 4 are or is arranged between the plates 10 and 11 along the stacking direction. Moreover, the clamping device 9 comprises at least one or a plurality of tension rods, wherein the respective tension rod is connected to the plates 10 and 11. By means of the tension rod, via which at least one tensile force takes effect, the plates 10 and 11 are clamped or braced against one another with mediation of the storage cells 2, such that the storage cells 2 are pressed together and thus held against one another by way of the plates 10 and 11 by means of the tension rod.

Along the stacking direction between the respective plate 10 or 11 and the storage cell 2 immediately or directly following the respective plate 10 or 11, a thermal insulation 12 is arranged in order to avoid an excessive heat exchange between the respective plate 10 or 11 and the storage cell 2 directly following the latter.

In order, then, that the number of parts and thus the weight, the structural space requirement and the costs of the storage module 1 and thus of the energy store overall can be kept low, the heating elements 6 are interconnected with one another and thereby electrically connected to one another in accordance with the same circuit topology in accordance with which the storage cells 2 are interconnected with one another. Since the circuit topology is a series circuit, the heating elements 6 are also connected in series with one another or interconnected in series with one another, such that a series circuit of the heating elements 6 is provided. As a consequence, both the storage cells 2 among one another and the heating elements 6 among one another can be embodied as identical parts, such that different structural variants can be realized in a simple manner.

By virtue of the fact that the heating elements 6 are interconnected in series with one another, the same electrical current, also referred to as heating current, flows through all the heating elements 6, by means of which the current the storage cells 2 can be heated or warmed up.

Figure 2:
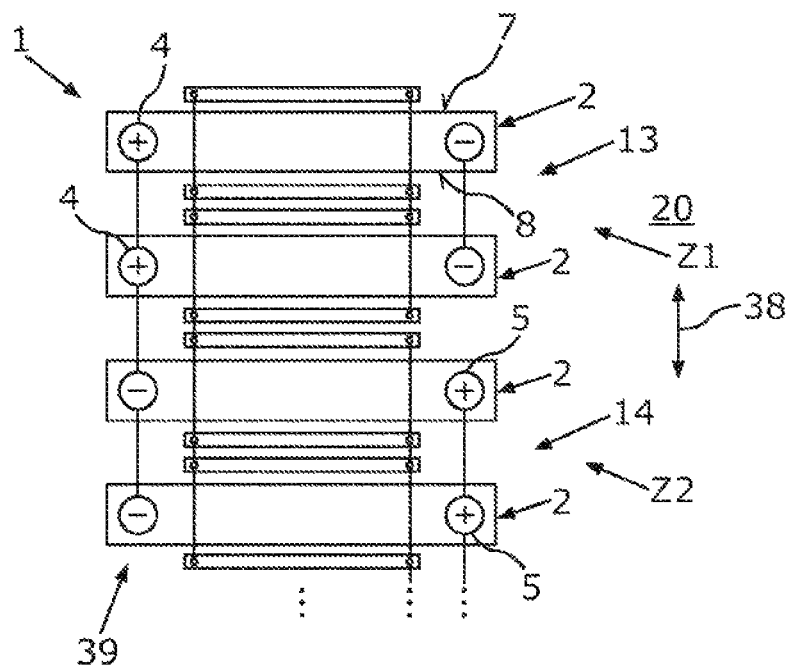
FIG. 2 shows as an excerpt a schematic plan view of the storage module in accordance with the present subject matter.

FIG. 2 shows where all of the storage cells 2 of the storage module 1 or some of the storage cells 2 of the storage module 1 are interconnected in parallel with one another. Consequently, the circuit topology is a parallel circuit of the storage cells 2, wherein the associated heating elements 6 are also interconnected in parallel with one another. As a result, for example, the circuit illustrated in FIG. 2 can be constructed with the same components as in FIG. 1, such that the storage cells 2 of FIG. 1 and the storage cells 2 of FIG. 2 are constructed identically, and the heating elements 6 of the FIG. 1 and the heating elements 6 of FIG. 2 are also embodied structurally identically. Consequently, for example, all the heating elements 6 are structurally identical for the same heating current.

It is evident from FIG. 2 that two storage cells, designated by 13, from among the storage cells 2 are interconnected in parallel with one another and thereby form a first cell group Z1, which is also referred to as a first cell cluster. Two storage cells, designated by 14, from among the storage cells 2 are interconnected in parallel with one another, as a result of which the storage cells 14 form a second cell group, designated by Z2. The second cell group is also referred to as a second cell cluster. The cell clusters Z1 and Z2 are interconnected in series with one another. In this case, the heating elements 6 of the first cell cluster are interconnected in parallel with one another and the heating elements 6 of the second cell cluster are interconnected in parallel with one another. Consequently, the heating elements 6 of the first cell cluster that are interconnected in parallel with one another form a first heating element cluster, wherein the heating elements 6 of the second cell cluster that are interconnected in parallel with one another form a second heating element cluster. In this case, the heating element clusters are interconnected in series with one another. In FIG. 2, too, the heating elements 6 are interconnected with one another with the same circuit topology as the storage cells 2 are also interconnected with one another.

It is evident from FIG. 1 that the storage module 1, in particular the cell stacks 4, has at most or exactly two switching elements 15 and 16, by means of which the heating elements 6 are electrically connectable to the storage cells 2 of the storage module 1 and thereby activatable and disconnectable from the storage cells 2 and thereby deactivatable. In this way, the number of parts and thus the costs, the structural space requirement and the weight can be kept within low limits. As a result of the heating elements 6 being electrically connected to the storage cells 2, the electrical voltage provided by the storage module 1 is impressed on the heating elements 6, as a result of which the heating elements 6 are supplied with electrical current or with electrical energy and are thereby operated. As a consequence, the storage cells 2 are heated.

Arrows 17 in FIG. 1 illustrate that the heating elements 6 and the storage cells 2 can be electrically interconnected with or connected to a further consumer such as, for example, a second one of the storage modules of the energy store. As is additionally evident from FIG. 1, the switching element 15 is assigned to one of the electrical positive poles or arranged at one of the electrical positive poles, while the switching element 16 is assigned to one of the electrical negative poles or is assigned at one of the electrical negative poles or is arranged at one of the electrical negative poles.

Figure 3:
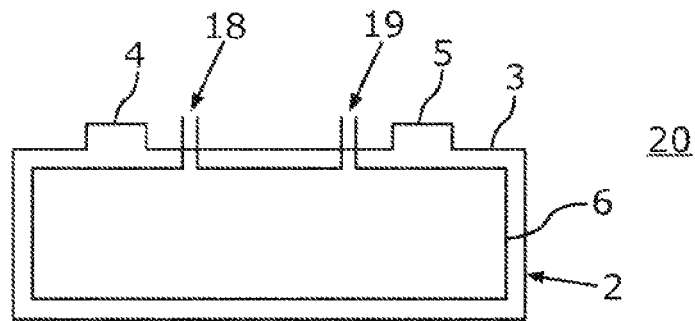
FIG. 3 shows as an excerpt a schematic front view of the storage module in accordance with the present subject matter.

FIG. 3 shows the storage module 1. The heating element 6 is arranged within the cell housing 3. In this case, it is evident from FIG. 3 that the respective heating element 6 has two terminals 18 and 19, wherein the heating elements 6 are electrically connected to one another via their respective terminals 18 and 19. Both the terminal 18 and the terminal 19 of the electrical heating element 6 arranged within the cell housing 3 are led out from the cell housing 3 and thus to the surroundings 20 thereof. Consequently, the terminals 4, 5, 18 and 19 are respective terminals which are separate and, for example, electrically insulated from one another. Moreover, it is evident from FIG. 3 that the heating element 6 is embodied, for example, as a planar heating element, in particular as a heating film.

Figure 4:
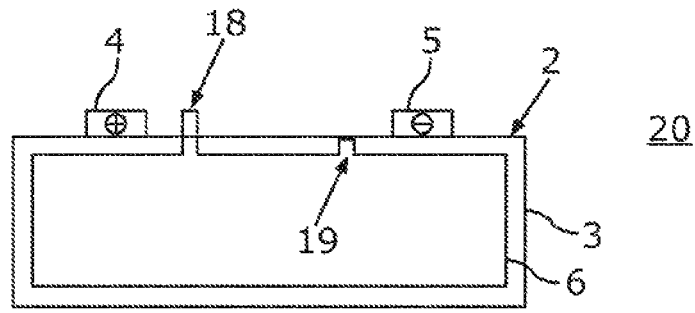
FIG. 4 shows a schematic front view of the storage module in accordance with the present subject matter.

FIG. 4 shows where the terminal 18 of the electrical heating element 6 arranged within the cell housing 3 is led out from the cell housing 3 and is led to the surroundings 20, while the terminal 19 of the heating element 6 is electrically connected to the housing 3 and in this case is arranged, in particular completely, within the cell housing 3. The cell housing 3 is formed, for example, from an electrically conductive material, in particular from an electrically conductive metallic material, wherein the cell housing 3 can be formed from aluminum, for example. Alternatively or additionally, the respective terminal 4 or 5 can be formed from an electrically conductive material, in particular from an electrically conductive metallic material such as aluminum, for example. At least or exactly three terminals are provided, therefore, which are arranged outside the cell housing 3 at the surroundings 20 thereof. Said three terminals are the terminals 4 and 5 and the terminal 18. Four terminals in the form of the terminals 4, 5, 18 and 19 are arranged outside the cell housing 3, such that a four-terminal solution is provided in FIG. 3, exactly three terminals in the form of the terminals 4, 5 and 18 are arranged outside the cell housing 3 in FIG. 4. Consequently, a three-terminal solution is provided in FIG. 4. The terminals 4, 5 and 18 are preferably electrically insulated from the housing 3 and from the terminal 19, wherein preferably the terminals 4, 5 and 18 are electrically insulated from one another.

Since the respective terminal of the respective heating element 6 is electrically connected to the respective cell housing 3, the heating elements 6 are electrically interconnected with one another and thereby electrically connected to one another with mediation of the cell housings 3 of the storage cells 2. In order here to avoid undesired corrosion of the respective storage cell 2, in particular of the cell housing 3, provision is preferably made for the electrolyte accommodated in the cell housing 3 to be electrically insulated from the cell housing 3. For this purpose, for example, the cell housing 3 is provided, in particular coated or lined, with an electrical insulator on the internal periphery. In particular, the electrical insulator is applied to a lateral surface on the internal periphery of the cell housing 3 facing the electrolyte or the storage means.

Figure 5:
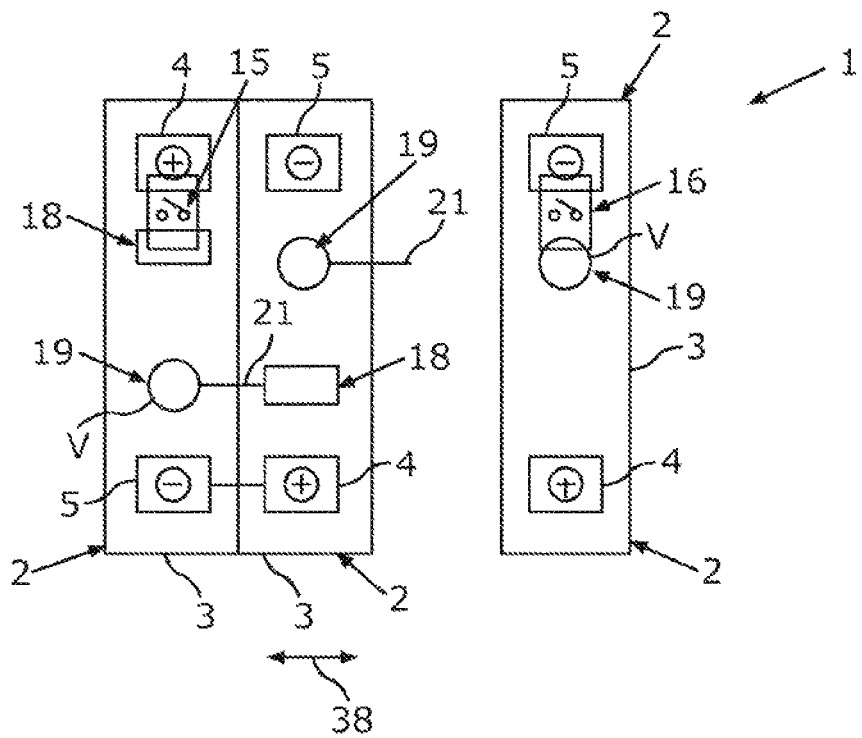
FIG. 5 shows as an excerpt a schematic plan view of the storage module in accordance with the present subject matter.

FIG. 5 shows as an excerpt in a schematic plan view of the storage module 1. The electrical interconnection of the heating elements 6 in the three-terminal solution is illustrated. Via the switching element 15, for example, the terminal 18 led out from the cell housing 3 is electrically connectable to the terminal 4 of the first storage cell 2 along the stacking direction and disconnectable from the terminal 4. In order, for example, to connect the terminal 19 of the heating element 6 of the first storage cell 2, said terminal being arranged within the cell housing 3, to the terminal 18 of the heating element 6 of the succeeding storage cell 2, a connection element 21 is provided, which is electrically connected, in particular is permanently electrically connected, at one end, with the mediation of the cell housing 3 of the first storage cell 2, to the terminal 19 of the heating element 6 of the first storage cell 2, and at the other end, in particular directly, to the terminal 18 of the heating element 6 of the succeeding storage cell 2.

With regard to the last storage cell 2, designated by L in FIG. 5, the terminal 19 arranged within the cell housing 3 of the last storage cell 2 is electrically connectable to the terminal 5 of the last storage cell L and disconnectable from the terminal 5 via the cell housing 3 of the last storage cell L and via the switching element 16. The respective connection element 21 is welded, in particular directly, to the respective cell housing 3 at a connection point, for example, wherein at the respective connection point the respective terminal 19 arranged within the respective cell housing 3 is electrically connected to the cell housing 3. Furthermore, the respective connection element 21 is welded to the respective terminal 18, for example. As a result of the respective welding, the respective connection element 21 is electrically connected to the connection point or electrically connected to the terminal 18.

Figure 6:
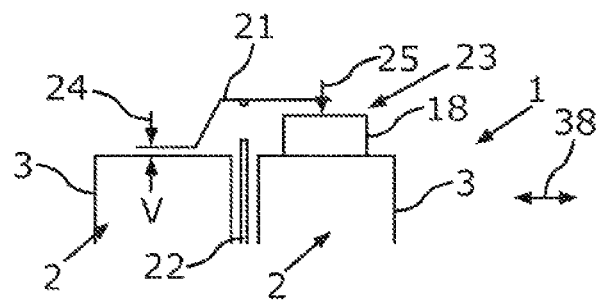
FIG. 6 shows as an excerpt a schematic side view of the storage module in accordance with the present subject matter.
Figure 7:
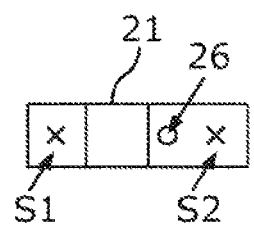
FIG. 7 shows as an excerpt a schematic plan view of the storage module in accordance with FIG. 6.

FIGS. 6 and 7 illustrate the storage module 1. Since the respective terminal 19 of the respective heating element 6 is electrically connected to the respective cell housing 3, respective electrical insulators 22 are arranged between the cell housings 3, by means of which insulators the cell housings 3 are electrically insulated in relation to one another or from one another. Furthermore, the connection element 21 is evident particularly well from FIGS. 6 and 7. The connection element 21 is arranged on a respective side 23 of the respective storage cell 2. In the installation position of the storage module 1, the side 23 faces upward in the vertical direction of the vehicle, for example, such that the side 23 is, for example, a top side of the respective storage cell 2. In this case, the storage module 1 assumes its installation position in the fully manufactured state of the motor vehicle. In this case, the terminals 4, 5, 18 and 19 and the connection point, designated by V in FIGS. 5 and 6, are also arranged on the side 23. As is illustrated by an arrow 24 in FIG. 6, at the connection point V the connection element 21 can be electrically connected to the cell housing 3 and via the cell housing 3 to the terminal 19 in such a way that the connection element 21 is welded to the cell housing 3 at the connection point V from above in the vertical direction of the vehicle. As a result, the connection element 21 is also mechanically connected to the cell housing 3. In particular, it is conceivable for the terminal 19 to be electrically and preferably also mechanically connected, in particular welded, to the cell housing 3 at the connection point V. As is furthermore illustrated by an arrow 25, the connection element 21 can moreover be electrically and preferably also mechanically connected to the terminal 18 in such a way that the connection element 21 is welded to the terminal 18 from above or from the side 23 in the vertical direction of the vehicle.

FIG. 7 here illustrates respective welding points S1 and S2. The welding point S1 coincides with the connection point V, for example, since the connection element 21 is welded to the housing 3 from the side 23 at the welding point S1. The connection element 21 is welded to the terminal 18 from the side 23 at the welding point S2. The connection element 21 has, for example, an opening 26 embodied as a through opening, for example, and also referred to as a positioning hole, into which opening, for example, a mount provided on a cell contacting system can engage. By means of the mount and by means of the opening 26, the connection element 21 can be held on the cell contacting system (CCS), in particular on the frame thereof. The cell contacting system is a connection device by means of which the storage cells 2 are electrically connected to one another in accordance with the respective circuit topology. By virtue of the fact that the connection element 21 can be held on the frame or on the cell contacting system, for example, mounting of the cell contacting system can be accompanied by mounting or arrangement of the connection element 21 on the storage cells 2. After mounting or arrangement of the connection element 21 has been effected, the respective connection element 21 is connected, in particular welded, to the cell housing 3 and to the terminal 18, for example, at the welding points S1 and S2.

Figure 8:
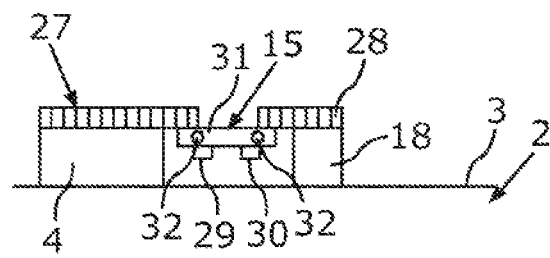
FIG. 8 shows as an excerpt a schematic side view of the storage module in accordance with the present subject matter.

FIG. 8 illustrates a linking, for example, of the switching element 15 to the terminal 18 at one end and to the terminal 4 at the other end. For this purpose, for example, a plate 27 formed from an electrically conductive material, in particular from an electrically conductive metallic material such as aluminum, for example, is provided, which is connected, in particular welded, to the terminal 4 and projects beyond the terminal 4. Moreover, a plate 28 formed from an electrically conductive material, in particular from an electrically conductive metallic material such as aluminum, for example, is provided, which is connected, in particular welded, to the terminal 18 and projects beyond the terminal 18. In this case, the switching element 15 is arranged on respective sides of the plates 27 and 28 facing the cell housing 3 of the storage cell 2 and is electrically and preferably mechanically connected, in particular welded, to the plates 27 and 28.

Moreover, it is evident particularly well from FIG. 8 that the switching element 15 or respectively 16 can have at most or exactly two switches 29 and 30, which are embodied as MOSFETs, for example. Moreover, the switching element 15 or respectively 16 can have a circuit board 31, on which the switches 29 and 30 are arranged. The respective switch 29 and/or 30 can be assigned preferably exactly one optocoupler 32, which is illustrated schematically in FIG. 8 and by means of which switchover of the respectively assigned switch 29 and/or 30 can be effected.

Figure 9:
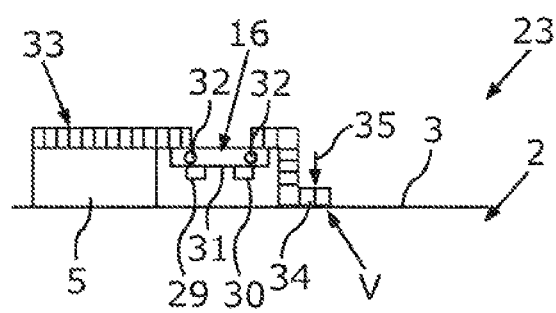
FIG. 9 shows as an excerpt a schematic plan view of the storage module in accordance with FIG. 8.

FIG. 9 shows wherein a linking of the switching element 16 to the terminal 5 at one end and, at the other end, to the cell housing 3 of the storage cell 2 having the terminal 5 is illustrated with reference to FIG. 9. A plate 33 is provided here, too, which is formed from an electrically conductive material, in particular from an electrically conductive metallic material, and projects beyond the terminal 5. Moreover, a terminal piece 34 is provided, which can be formed from an electrically conductive material, in particular from an electrically conductive metallic material such as aluminum, for example. The plate 33 is connected, in particular welded, to the terminal 5 and projects beyond the terminal 5. The terminal piece 34 is connected, in particular welded, to the cell housing 3. Furthermore, the terminal piece 34 is electrically connected to the cell housing 3, in particular at the connection point V.

As is illustrated by an arrow 35 in FIG. 9, the terminal piece 34 is electrically and preferably also mechanically connected to the cell housing 3, for example, by the terminal piece 34 being welded to the cell housing 3 at the connection point V from above or from the side 23 in the vertical direction of the vehicle.

Since the plate 33 projects beyond the terminal 5, the plate 33 has a side facing the cell housing 3. The terminal piece 34 is embodied at least substantially in a Z-shaped fashion and likewise has a side facing the cell housing 3. In this case, the switching element 16 is arranged on the respective sides of the plate 33 and of the terminal piece 34 that face the cell housing 3, and is electrically connected to the plate 33 and to the terminal piece 34.

Overall it is evident that it is possible to produce a space-saving and cost-effective electrical and mechanical linking of the switching element 15 and/or 16 to the terminals 4, 5 and 18 and to the cell housing 3, in particular with the mediation of the plates 27, 28 and 33 and with the mediation of the terminal piece 34.

Figure 10:
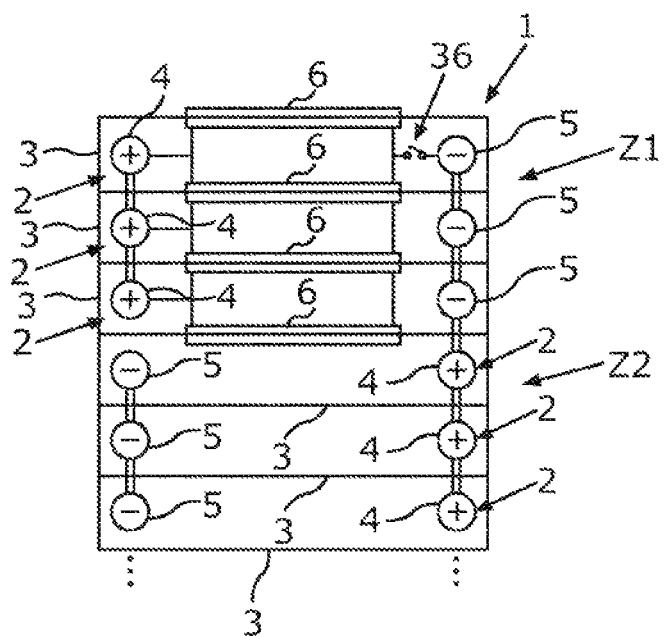
FIG. 10 shows as an excerpt a schematic plan view of the storage module in accordance with the present subject matter.

FIG. 10 shows the storage module 1, in which the cell group Z1 comprising the storage cells 2 interconnected in parallel with one another and the cell group Z2 comprising the storage cells 2 interconnected in parallel with one another are provided, wherein the cell groups Z1 and Z2 are interconnected in series with one another or connected in series with one another. As is evident on the basis of the example of the cell group Z1, exactly one switching element 36 is provided per cell group Z1 or Z2, by means of which switching element the heating elements 6 of the respective cell group Z1 or Z2 are electrically connectable to the storage cells 2 of the storage module 1 and thereby activatable and disconnectable from the storage cells 2 of the storage module 1 and thereby deactivatable. The explanations above and below concerning the respective switching element 15 or 16 can readily also be applied to the switching element 36, and vice versa.

The respective heating element 6 is in each case fixedly connected on one side to one of the electrical poles and in the present case to the electrical positive pole of the respective storage cell 2. On the respective other side, the heating elements 6 are electrically connectable to the corresponding other electrical pole via the switching element 36. As an alternative thereto, it is conceivable for exactly two switching elements to be provided per cell group Z1 or Z2, respectively, such that, for example, the heating elements 6 of the respective cell group Z1 or Z2 are electrically connectable to the respective positive poles via a first of the exactly two switching elements and are electrically connectable to the respective negative poles via the second of the exactly two poles. Like the respective switching element 15 and 16, the switching element 36 can have at most or exactly two switches, embodied as MOSFETs, for example. The switches are interconnected in series with one another or connected in series with one another, for example.

Figure 11:
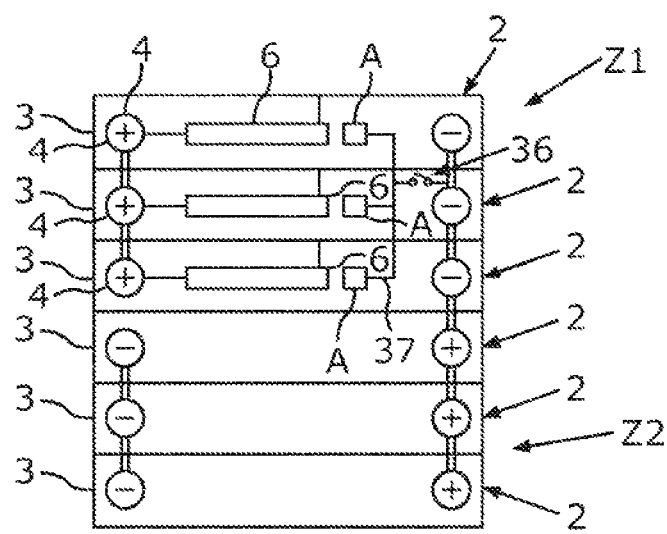
FIG. 11 shows as an excerpt a schematic plan view of the storage module in accordance with the present subject matter.

FIG. 11 shows wherein the respective cell group Z1 or Z2 comprises a plurality of storage cells 2, and in this case at most, or exactly three storage cells 2, which are interconnected, in particular exclusively, in parallel with one another. The respective heating element 6 is fixedly connected at one end to one of the electrical poles and in the present case to the respective positive pole of the respective storage cell 2, in particular via the respective terminal 4. At the other end the respective heating element 6 is, for example, electrically connected to the cell housing 3 or led out as a third terminal from the cell housing 3. In FIG. 11, a linking point to the cell housing 3 is designated by A. In this case, a connection element 37, also referred to as a connector, is provided, for example, which is electrically connected to the cell housings 3 of the storage cells 2 at the linking points A. Consequently, at the connection points A, with the mediation of the cell housings 3, the connection element 37 is electrically connected to the heating elements 6, in particular electrically connected to the terminals 19 arranged in the cell housings 3. Via the switching element 36, the connection element 37 can be electrically connected to the negative poles and disconnected therefrom in order thereby to be able to electrically connect the heating elements 6 of the cell group Z1 or Z2, respectively, to the storage cells 2 and disconnect them from the latter. In this case, exactly one switching element 36 is provided per cell cluster.

Figure 12:
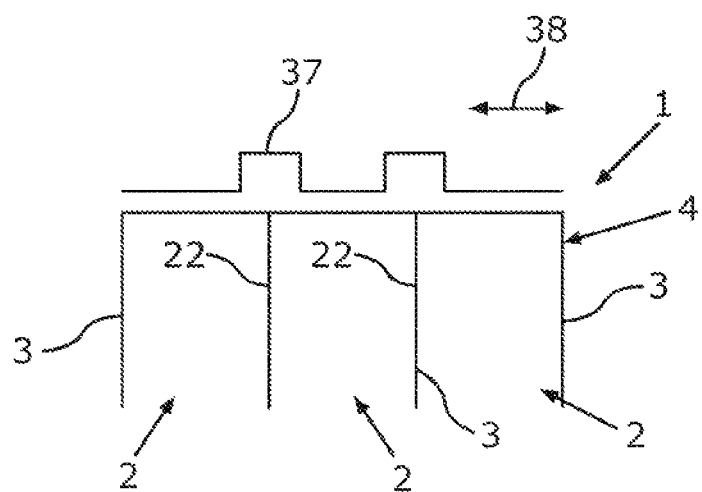
FIG. 12 shows as an excerpt a schematic plan view of the storage module in accordance with FIG. 11.

Since, for example, the heating elements 6 are electrically linked to the cell housings 3, the respective electrical insulator 22 is provided—as is evident from FIG. 12—between the storage cells 2 or between the cell housings 3, the cell housings 3 being electrically insulated from one another by means of said electrical insulator.

If the respective heating element 6 is arranged in the respective cell housing 3, for example, provision can be made for the heating element 6, in particular via its terminal 18, to be electrically connected to the terminal 4 or 5, respectively, within the cell housing 3. The respective other terminal 19 or 18 is then electrically connected to the cell housing 3 and can be connected to the storage cells 2 or to the corresponding other terminal 5 or 4, respectively, via the connection element 37. In this case, the connection element 37 is evident particularly well from FIG. 12. In this case, the connection element 37 is arranged above the insulator 22, also referred to as insulation, or is led across the latter.

LIST OF REFERENCE SIGNS

1 Storage module
2 Storage cell
3 Cell housing
4 Terminal
5 Terminal
6 Heating element
7 Side
8 Side
9 Clamping device
10 Plate
11 Plate
12 Thermal insulator
13 Storage cells
14 Storage cells
15 Switching element
16 Switching element
17 Arrow
18 Terminal
19 Terminal
20 Surroundings
21 Connection element
22 Electrical insulator
23 Side
24 Arrow
25 Arrow
26 Opening
27 Plate
28 Plate
29 Switch
30 Switch
31 Circuit board
32 Optocoupler
33 Plate
34 Terminal piece
35 Arrow
36 Switching element
37 Connection element
38 Double-headed arrow
39 Cell stack
A Linking point
L Last storage cell
S1 Welding point
S2 Welding point
V Connection point
Z1 First cell group
Z2 Second cell group

What is claimed is:

1. A storage module for an energy store of a motor vehicle, comprising:
   a plurality of storage cells for storing electrical energy and being interconnected with one another and electrically connected to one another in accordance with a circuit topology;
   a plurality of electrical heating elements;
   wherein each respective storage cell of the plurality of storage cells is assigned at least one electrical heating element of the plurality of electrical heating elements for heating the respective storage cell;
   wherein the electrical heating elements of the plurality of electrical heating elements are interconnected with one another and are electrically connected to one another in accordance with the same circuit topology;
   wherein the storage module has two switching elements that are together configured to:
      electrically connect the plurality of electrical heating elements to the plurality of storage cells to activate the plurality of electrical heating elements; and
      electrically disconnect the plurality of electrical heating elements from the plurality of storage cells to deactivate the plurality of electrical heating elements; and
   wherein:
      a first switching element of the two switching elements is electrically connected in series with the plurality of electrical heating elements and with a positive pole of a first storage cell of the plurality of storage cells; and
      a second switching element of the two switching elements is electrically connected in series with the plurality of electrical heating elements and with a negative pole of a second storage cell of the plurality of storage cells.

2. The storage module according to claim 1, wherein each of the two switching elements comprises two switches.

3. The storage module according to claim 2, wherein for each switching element, the two switches of the switching element are connected in series.

4. The storage module according to claim 2, wherein for each switching element, the two switches of the switching element are assigned exactly one optocoupler to effect a switchover of an assigned switch.

5. The storage module according to claim 3, wherein for each switching element, the two switches of the switching element are assigned exactly one optocoupler to effect a switchover of an assigned switch.

6. The storage module according to claim 1, wherein:
   each respective electrical heating element of the plurality of electrical heating elements has two terminals; and
   the electrical heating elements of the plurality of heating elements are interconnected with one another via the terminals.

7. The storage module according to claim 6, wherein:
   one of the terminals of each respective electrical heating element is electrically connected to a respective cell housing of the storage cell assigned to the respective electrical heating element; and the electrical heating elements of the plurality of heating elements are electrically interconnected with one another with a mediation of the cell housings of the storage cells.

8. The storage module according to claim 7, wherein for a cell housing of the cell housings of the storage cells, an electrolyte is accommodated in the cell housing and is electrically insulated from the cell housing.

9. The storage module according to claim 1, wherein the storage cells are arranged successively along a stacking direction, wherein
at least one electrical heating element is arranged on two sides of the respective storage cell that face away from one another along the stacking direction.

10. An energy store for a motor vehicle, comprising:
at least one storage module according to claim 1.

11. A storage module for an energy store of a motor vehicle, comprising:
a plurality of cell groups, each comprising:
a plurality of storage cells for storing electrical energy and being interconnected in parallel with one another and electrically connected to one another; and
a plurality of electrical heating elements;
wherein:
each respective storage cell of the respective cell group is assigned at least one electrical heating element of the plurality of electrical heating elements for heating the respective storage cell; and
exactly one switching element is provided per cell group, the switching element electrically connected in series with the plurality of heating elements and configured to:
electrically connect the plurality of electrical heating elements of the respective cell group to the plurality of storage cells of the storage module to activate the plurality of electrical heating elements; and
electrically disconnect the plurality of electrical heating elements from the plurality of storage cells of the storage module to deactivate the plurality of electrical heating elements.

* * * * *